D. MILLER & W. H. JOHNSON.
Drag-Sawing Machine.
No. 204,836.　　　　　Patented June 11, 1878.
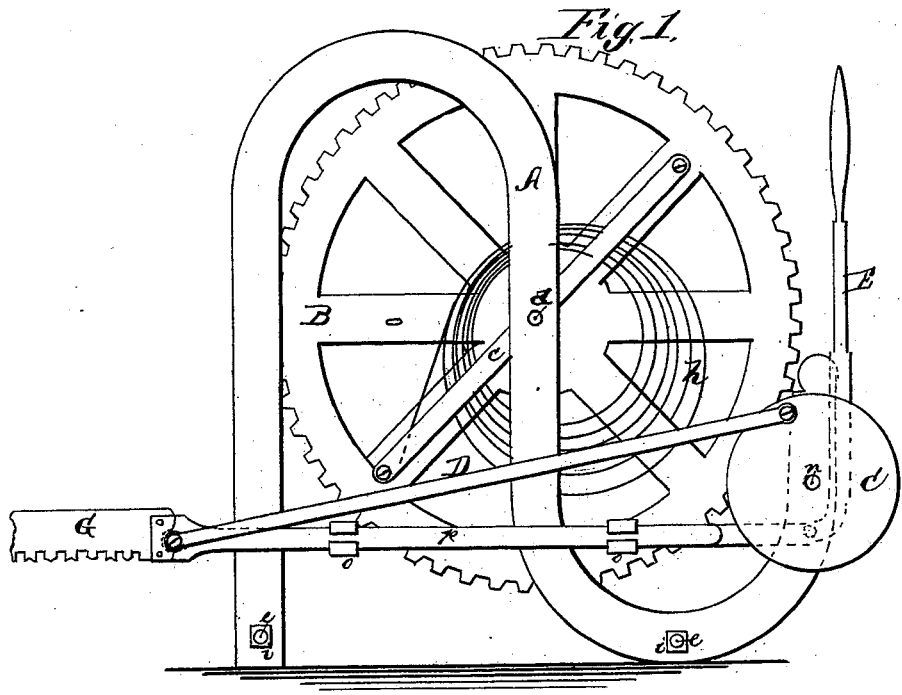
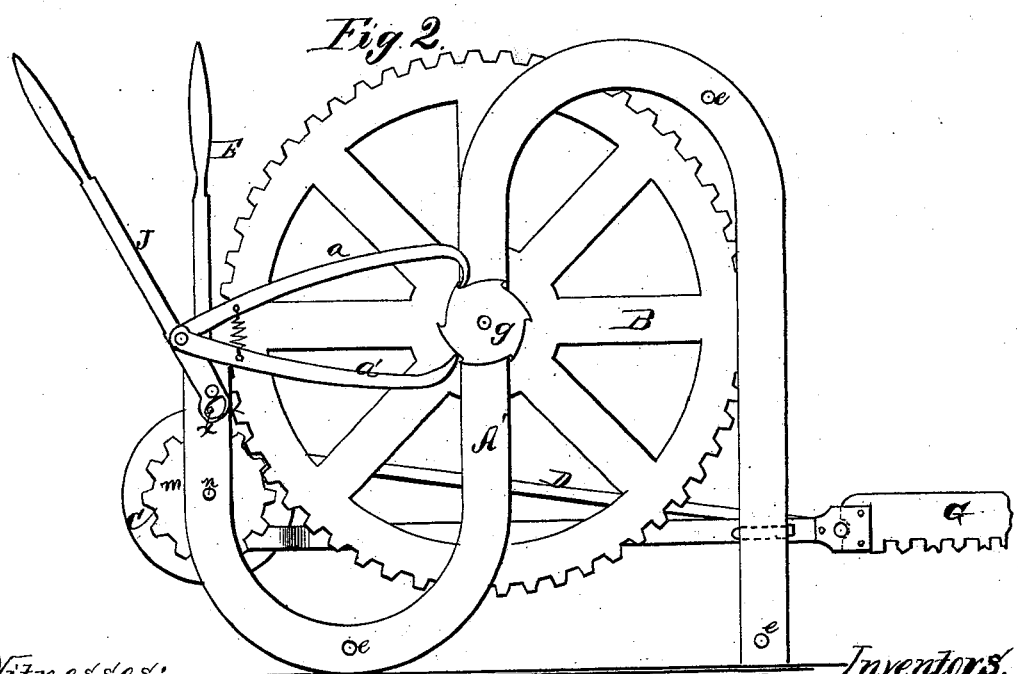

UNITED STATES PATENT OFFICE.

DAVID MILLER AND WILLIAM H. JOHNSON, OF HARRODSBURG, INDIANA.

IMPROVEMENT IN DRAG-SAWING MACHINES.

Specification forming part of Letters Patent No. 204,836, dated June 11, 1878; application filed May 3, 1878.

*To all whom it may concern:*

Be it known that we, DAVID MILLER, and WM. H. JOHNSON, of Harrodsburg, in the county of Monroe and State of Indiana, have invented certain new and useful Improvements in Wood-Sawing Machines; and we do hereby declare that the following is a full, clear, and exact description thereof, reference being had to the accompanying drawings, and to the letters of reference marked thereon, which form part of this specification, in which both figures are side elevations.

The nature of our invention consists in the arrangement of a wood-sawing machine operated by means of a coiled spring, substantially as hereinafter more fully set forth.

To enable others skilled in the art to make and use our invention, we will now proceed to describe its construction and operation.

The frame is composed of two sinuous pieces, A A', braced and held at a convenient distance apart by means of the rods e e and nuts i i.

d is a loose shaft, having its bearings in the frame A A', and with the ratchet-wheel g secured to its outer end, as seen in Figure 2. Upon this shaft, but between the pieces A A', is also the spur-wheel B and coiled spring h, the latter having its inner end secured to the shaft, while its outer end passes around a bolt in the wheel B, near its periphery.

c is a plate or bar of metal, through the center of which the shaft d passes loosely. The ends of this bar c are secured to the spur-wheel B by means of bolts, as seen in Fig. 1. Between this bar and the spur-wheel B the coiled spring is located and fastened.

a a' are pawls, secured by rivets upon the opposite sides of the lever J, and are held together by a small coiled spring, as shown in Fig. 2. Thus by operating the lever J the coil-spring is wound up and the machine is set in motion. The lower end of this lever J is provided with an elongated hole, in which, secured to the frame, is a small pin, x, the object of which is to act as a stop or check to the lever.

m is a pinion on shaft n, which gears in spur-wheel B. On the outer end of this shaft n is secured the driving-wheel C, to which is fastened, near its periphery, as seen in Fig. 1, the pitman D.

E represents a hand-lever, which is L-shaped, and its lower arm extends along the entire length of the frame, and to which are secured on its outer side the metal slide-rests o o.

p represents a slide working easily in the rests o o, and to the outer end of which is attached the saw G. The pitman D is also secured to the end of slide p, as fully seen in Fig. 1. The hand-lever E is pivoted to the frame just below the bearing of shaft n.

The operation of the machine is as follows: The saw being properly adjusted over the log to be severed, the necessary power to drive or operate the saw is given simply by winding up the coil-spring by means of lever J.

Having thus fully described our invention, what we claim, and desire to secure by Letters Patent, is—

In a sawing-machine, the combination of the frame A A', hand-lever J, pawls a a', loose shaft d, coil-spring h, spur-wheel B, pinion m, shaft n, driving-wheel C, pitman D, slide R, and adjusting hand-lever E, all constructed and arranged to operate in the manner and for the purposes herein set forth.

In testimony that we claim the foregoing as our own we affix our signatures in presence of two witnesses.

DAVID MILLER.
WILLIAM H. JOHNSON.

Witnesses:
WILLIAM F. CORMAN,
OWEN D. EVANS.